US012306813B2

United States Patent
Chenthamarakshan et al.

(10) Patent No.: US 12,306,813 B2
(45) Date of Patent: *May 20, 2025

(54) OBJECT MANAGEMENT SYSTEM FOR EFFICIENT CONTENT ITEM MANAGEMENT

(71) Applicant: Dropbox, Inc., San Francisco, CA (US)

(72) Inventors: Anup Chenthamarakshan, Sunnyvale, CA (US); Adam Faulkner, San Francisco, CA (US); Ping Hu, San Francisco, CA (US); Alexander Sosa, San Jose, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,364

(22) Filed: Dec. 14, 2023

(65) Prior Publication Data

US 2024/0111738 A1 Apr. 4, 2024

Related U.S. Application Data

(63) Continuation of application No. 17/137,092, filed on Dec. 29, 2020, now Pat. No. 11,860,836.

(51) Int. Cl.
*G06F 16/215* (2019.01)
*G06F 16/22* (2019.01)
(Continued)

(52) U.S. Cl.
CPC .......... *G06F 16/215* (2019.01); *G06F 16/22* (2019.01); *G06F 16/2365* (2019.01); *G06F 16/289* (2019.01); *H04L 67/01* (2022.05)

(58) Field of Classification Search
CPC ...... G06F 16/215; G06F 16/289; G06F 16/22; G06F 16/2365; H04L 67/01
See application file for complete search history.

(56) References Cited

U.S. PATENT DOCUMENTS

| 5,937,402 | A | 8/1999 | Pandit |
|---|---|---|---|
| 6,182,151 | B1 | 1/2001 | Cheng et al. |

(Continued)

FOREIGN PATENT DOCUMENTS

EP 3557436 A1 10/2019

OTHER PUBLICATIONS

Final Office Action from U.S. Appl. No. 17/137,092, mailed Aug. 18, 2023, 25 pages.

(Continued)

*Primary Examiner* — Jensen Hu
(74) *Attorney, Agent, or Firm* — Polsinelli PC

(57) ABSTRACT

An object management system (OMS) receives a plurality of objects to be stored. The OMS identifies a subset of objects associated with a same time period and a same namespace from the plurality of objects and generates a batch object comprising the subset of objects. The OMS issues a write request to store the batch object in an object storage system (OSS) and stores, for each object in the subset of objects, a data structure comprising an identifier of the batch object and a position of the object within the batch object. Upon receiving a read request for an object, the OMS determines, based on the data structure, whether the object is stored in the OSS and issues a read request to the OSS based on the identifier of the batch object and the position of the object within the batch, if the objects is stored in the OSS.

20 Claims, 11 Drawing Sheets

(51) Int. Cl.
    *G06F 16/23*    (2019.01)
    *G06F 16/28*    (2019.01)
    *H04L 67/01*    (2022.01)

(56) References Cited

U.S. PATENT DOCUMENTS

| | | |
|---|---|---|
| 8,850,073 B1 | 9/2014 | Wilkes |
| 8,924,974 B1 | 12/2014 | Ruggiero et al. |
| 2004/0260972 A1 | 12/2004 | Ji et al. |
| 2011/0196829 A1 | 8/2011 | Vickrey et al. |
| 2011/0264704 A1* | 10/2011 | Mehra .................. G06F 16/289 |
| | | 707/802 |
| 2012/0246129 A1 | 9/2012 | Rothschild et al. |
| 2014/0250073 A1 | 9/2014 | Zalpuri et al. |
| 2017/0315735 A1 | 11/2017 | Leggette et al. |
| 2020/0327097 A1 | 10/2020 | Birka et al. |
| 2020/0363979 A1 | 11/2020 | Viraraghavan et al. |
| 2022/0083566 A1* | 3/2022 | Ben Ze'Ev ......... G06F 16/2282 |

OTHER PUBLICATIONS

Non-Final Office Action from U.S. Appl. No. 17/137,092, mailed Mar. 1, 2023, 23 pages.

Notice of Allowance from U.S. Appl. No. 17/137,092, mailed Oct. 19, 2023, 20 pages.

* cited by examiner

Batch Object Datastore
510

610

| Object ID | Batch ID | Length | Offset | Expiration Time | Compliance Identifier | Checksum | KEK Version | EEK |
|---|---|---|---|---|---|---|---|---|
| Object 1 | Batch 1 | 1 unit | 0 unit | 8:00pm, 12/31/2020 | P1 | 1SHA256 | Version 1 | encryptedkey1 |
| Object 2 | Batch 1 | 1 unit | 1 unit | 8:00pm, 12/31/2020 | P1 | 2SHA256 | Version 2 | encryptedkey2 |
| Object 3 | Batch 2 | 2 units | 0 unit | 8:00pm, 12/31/2020 | P2 | 3SHA256 | Version 5 | encryptedkey3 |

620

| Batch ID | Length | Compliance Identifier | Status |
|---|---|---|---|
| Batch 1 | 2 units | P1 | Closed |
| Batch 2 | 2 units | P2 | Closed |
| Batch 3 | 3 units | P3 | Open |

*FIG. 6*

OBJECT MANAGEMENT SYSTEM FOR EFFICIENT CONTENT ITEM MANAGEMENT

CROSS REFERENCE TO RELATED APPLICATIONS

This application is a continuation of U.S. application Ser. No. 17/137,092, filed on Dec. 29, 2020, which is incorporated by reference in its entirety.

TECHNICAL FIELD

The disclosed embodiments generally relate to database technologies, and particularly to an object management system that efficiently organizes and arranges access to objects in a database.

BACKGROUND

Existing systems receive requests to store content in databases, and then individually store the requested content. When read requests are received, such systems identify the individual objects referenced in a given request and retrieve identified objects from the databases. Each read and write operation involves sending instructions and may consume resources such as time and network bandwidth.

SUMMARY

Systems and methods are disclosed herein for operating an object management system that enables efficient access to an object storage system by reducing operations accessing the object storage system. In an embodiment, the object management system reduces operations by consolidating objects that arrive within a same period of time and are associated with a same namespace into a batch. The object management system may then issue a write request to store the batch to an object storage system, and may store, for each object in the batch, a data structure including an identifier of the batch object and a position of the object within the batch.

The object management system may further improve efficiency of operation of the object storage system by maintaining a mapping between objects and their respective batches in the data structure. Upon receiving a read request for an object, the object management system may determine, based on the data structure, whether the object is stored in the object storage system. If the object is stored in the object storage system, the object management system may issue a read request to the object storage system based on the identifier of the batch object and the position of the object within the batch.

The systems and methods disclosed herein provide various technical advantages. For example, the systems and methods disclosed herein improve upon utilization of various resources such as time, network bandwidth, and power consumption by reducing operations to access the object storage system, thus avoiding a need to perform separate operations for each object individually. In the context of write requests, the systems and methods disclosed herein improve efficiency by consolidating one or more objects into a batch and issuing a single write request for the batch, instead of issuing separate write requests for each object. The systems and methods disclosed herein further improve efficiency by reducing unnecessary access to the object storage system. This is at least performed by maintaining a data structure that stores metadata associated with objects and batches. The data structure enables a scenario where, upon receiving a read request of an object, the system does not access the object storage system if the object is identified as not stored in the object storage system based on the metadata, which in turn reduces unnecessary access to the object storage system. Yet further, the system and methods disclosed herein increase reliability and security by including various validity checks, status identifiers and versions of rotating encryption keys. For example, a status identifier ensures that a batch object is only removed from the system responsive to the batch successfully uploaded to the storage system and therefore preventing any data loss in transmission. Further technical advantages will be apparent based on the detailed description below.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 6 shows exemplary data structures for batch object datastore, according to one example embodiment.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Figure 1:
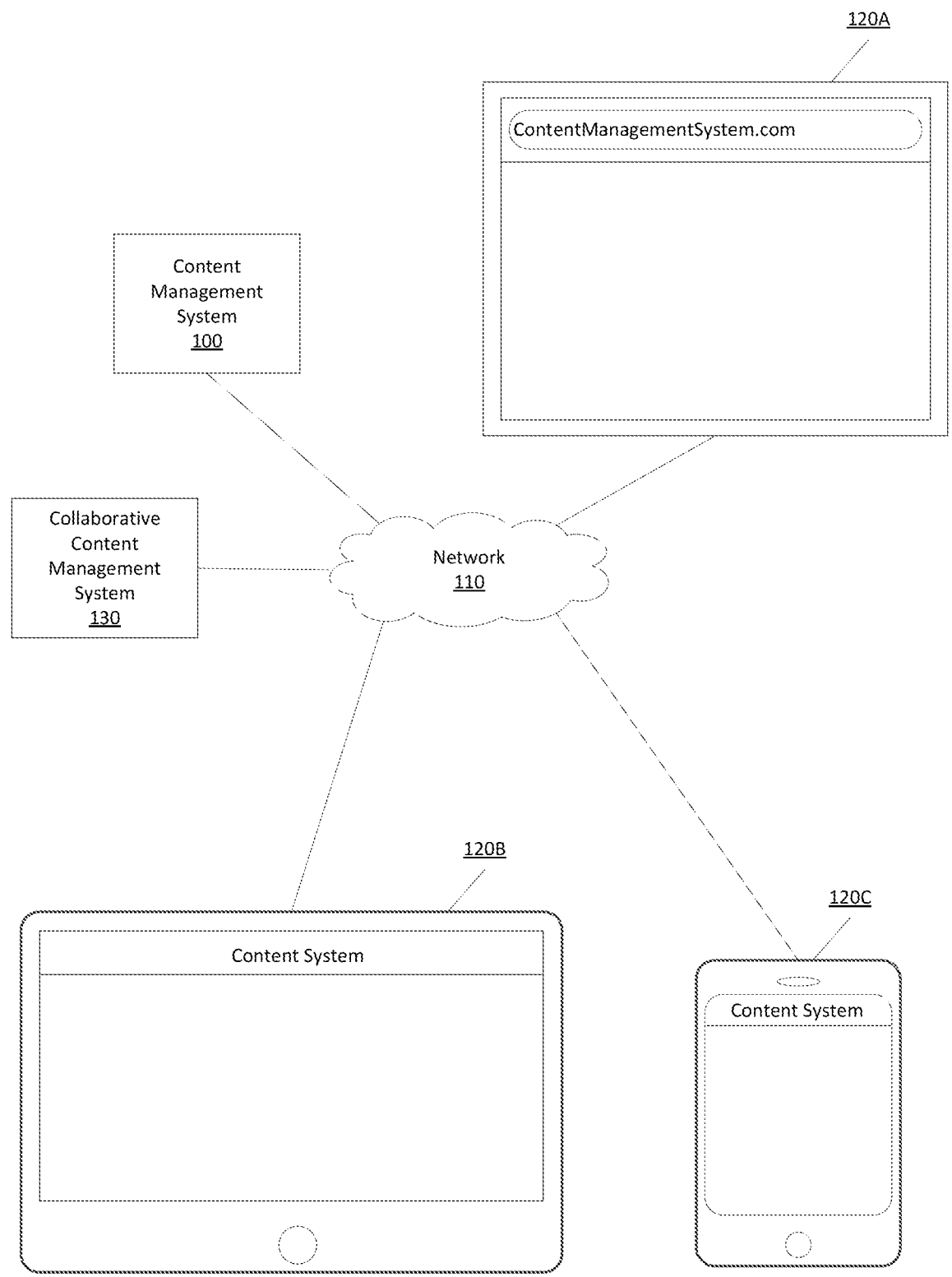
FIG. 1 shows a diagram of a system environment of a content management system and a collaborative content management system according to one embodiment.

FIG. 1 shows a system environment including content management system 100, collaborative content management system 130, and client devices 120*a*, 120*b*, and 120*c* (collectively or individually "120"). Content management system 100 provides functionality for sharing content items with one or more client devices 120 and synchronizing content items between content management system 100 and one or more client devices 120.

The content stored by content management system 100 can include any type of content items, such as documents, spreadsheets, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In one embodiment, the content stored by content management system 100 includes content items created by using third party applications, e.g., word processors, video and image editors, database management systems, spreadsheet applications, code editors, and so forth, which are independent of content management system 100.

In some embodiments, content stored by content management system 100 includes content items, e.g., collaborative content items, created using a collaborative interface provided by collaborative content management system 130. In various implementations, collaborative content items can be stored by collaborative content item management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In some embodiments, content management system 100 and collaborative content management system 130 are combined into a single system. The system may include one or more servers configured to provide the functionality discussed herein for the systems 100 and 130.

Client Device

Figure 2:
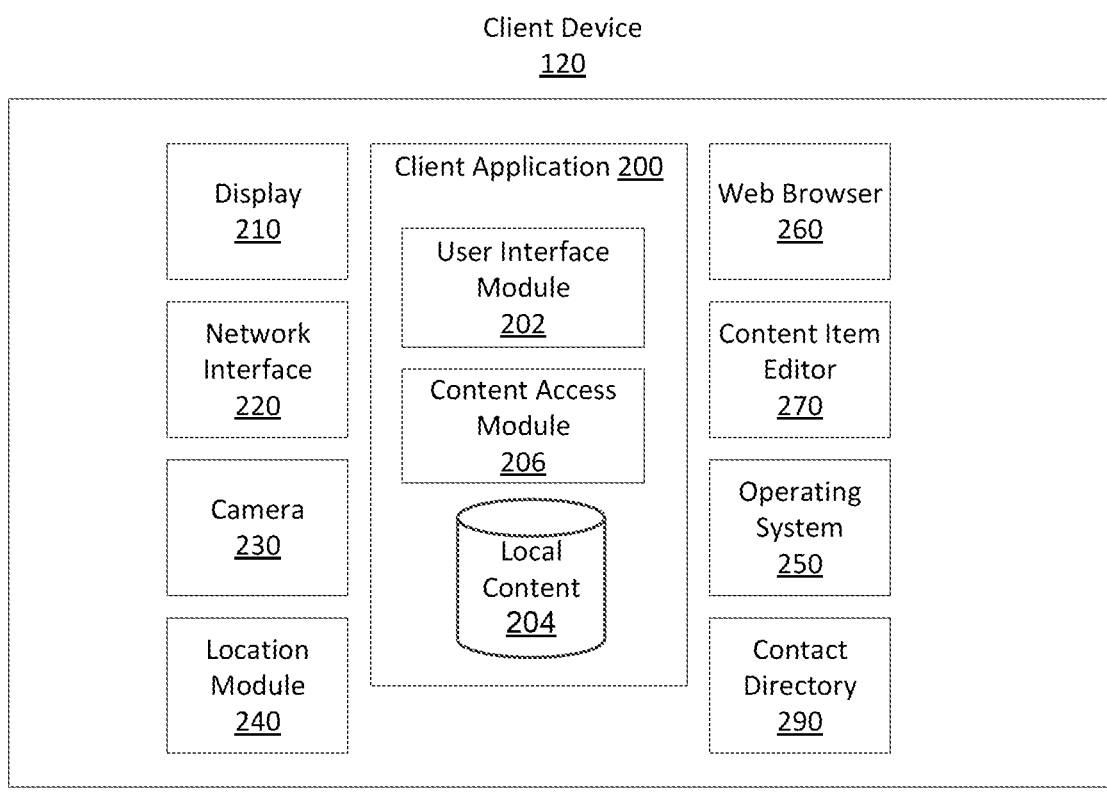
FIG. 2 shows a block diagram of components of a client device, according to one example embodiment.

FIG. 2 shows a block diagram of the components of a client device 120 according to one embodiment. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
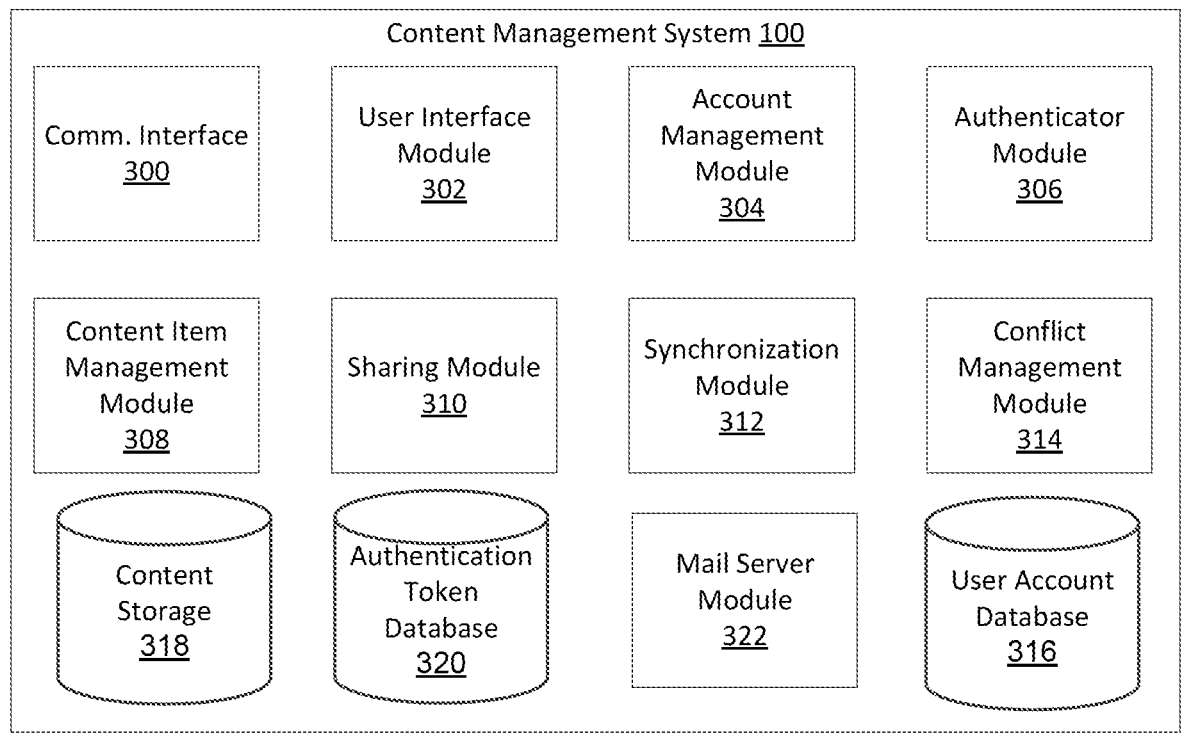
FIG. 3 shows a block diagram of a content management system, according to one example embodiment.

FIG. 3 shows a block diagram of the content management system 100 according to one embodiment. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a username. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. The cloud storage provider or network storage may be owned and managed by the content management system 100 or by a third party. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content storage 318 may further decrease the amount of storage space required by deleting content items based on expiration time of the content items. An expiration time for a content item may indicate that the content item is no longer needed after the expiration time and may therefore be deleted. Content storage 318 may periodically scan through the content items and compare expiration time with current time. If the expiration time of a content item is earlier than the current time, content storage 318 may delete the content item from content storage 318.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some embodiments, content management system 100 includes a content item management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

In another embodiment, the content item management module 308 consolidates content items, which may also be referred to as objects, into a batch object, which may also be referred to as a batch, and stores the batch object to content storage 318. The content item management module 308 may receive multiple objects from clients 120 to store in content storage 318. The content item management module 308 may create a batch object consolidating the objects and issue a single write request to store the batch object to content storage 318. The determination of which objects are to be consolidated may be based on information associated with the objects and the batches. For example, objects with same namespaces that arrive in a same time interval (e.g., within a predefined time interval of each other) may be grouped into a batch object. Additionally, responsive to detecting that the size of a group of incoming objects reaches a size limit or the group of objects have been waited for a certain amount of time that exceeds a time limit, the content item management module may consolidate the group of objects into a batch object without adding additional objects.

The content item management module 308 may store a data structure including metadata associated with the objects and the batch objects. The metadata may contain information such as mappings that map objects to their respective batches. The metadata may additionally, or alternatively, include information describing length and location associated with the objects and the batches. Any other information describing the object and/or the batch may be included within the metadata. Further details about the metadata are described in further detail in accordance with FIG. 6. For each request to access an object in content storage 318, the content item management module 308 may first check in the data structure for information such as expiration time for the object, before accessing content storage 318. The content item management module 308 may also perform batch compaction which consolidates batch objects containing both expired and non-expired objects into one batch object. Functionalities of the content item management module 308 are discussed in further detail below in accordance with FIG. 5.

In some embodiments, the content management system 100 can include a mail server module 322. The mail server module 322 can send (and receive) collaborative content items to (and from) other client devices using the collaborative content management system 100. The mail server module can also be used to send and receive messages between users in the content management system.

Collaborative Content Management System

Figure 4:
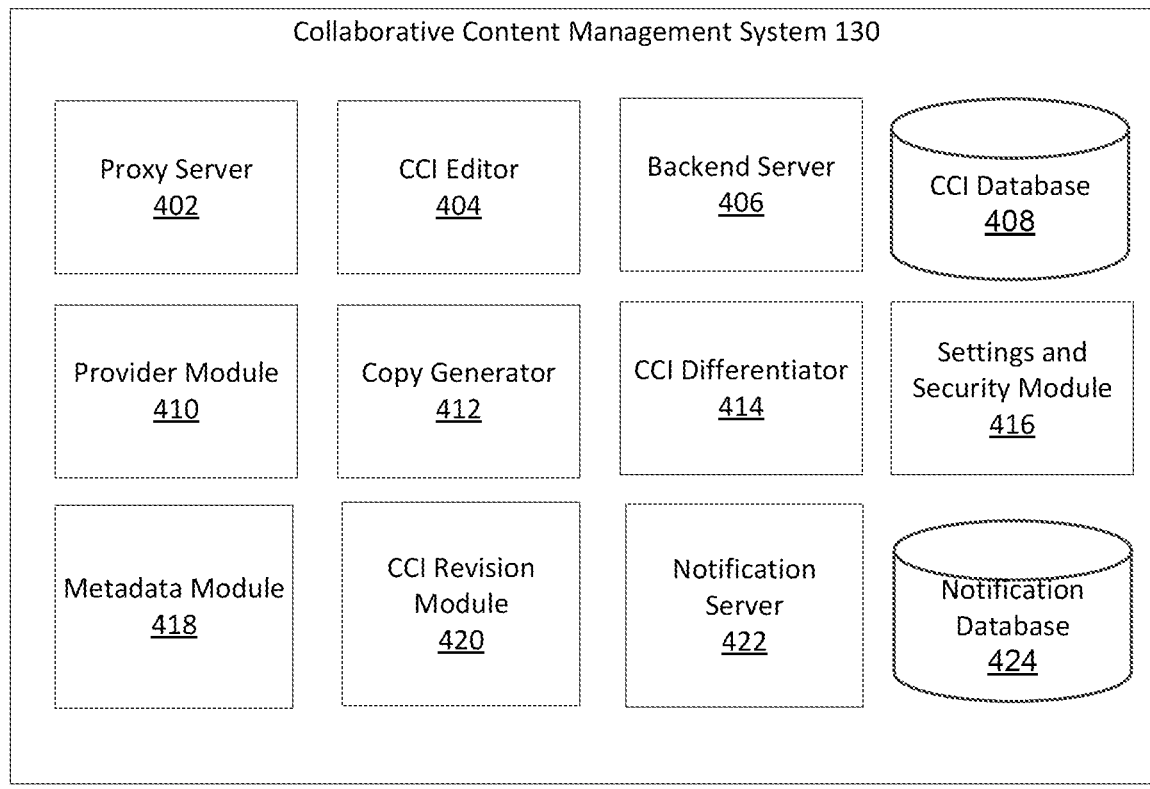
FIG. 4 shows a block diagram of a collaborative content management system, according to one example embodiment.

FIG. 4 shows a block diagram of the collaborative content management system 130, according to one embodiment. Collaborative content items can be files that users can create and edit using a collaborative content items editor 270 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In the embodiment of FIG. 1, collaborative content management system 130 is shown as separate from content management system 100 and can communicate with it to obtain its services. In other embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and collaborative content item database 408, access link module 410, copy generator 412, collaborative content item differentiator 414, settings module 416, metadata module 418, revision module 420, notification server 422, and notification database 424. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Collaborative content items database 408 contains a plurality of database objects representing collaborative content items, comment threads, and comments. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items proxy server 402 to client application 200, so the client application can directly communicate with the collaborative content item editor 404 for future requests. In an alternative embodiment, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The access module 410 receives a request to provide a collaborative content item to a client device. In one embodiment, the access module generates an access link to the collaborative content item, for instance in response to a request to share the collaborative content item by an author. The access link can be a hyperlink including or associated with the identification information of the CCI (i.e., unique identifier, content pointer, etc.). The hyperlink can also include any type of relevant metadata within the content management system (i.e., author, recipient, time created, etc.). In one embodiment, the access module can also provide the access link to user accounts via the network 110, while in other embodiments the access link can be provided or made accessible to a user account and is accessed through a user account via the client device. In one embodiment, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 410 can also provide collaborative content items via other methods. For example, the access module 410 can directly send a collaborative content item to a client device or user account, store a collaborative content item in a database accessible to the client device, interact with any module of the collaborative content management system to provide modified versions of collaborative content items (e.g., the copy generator 412, the CCI differentiator 414, etc.), sending content pointer associated with the collaborative content item, sending metadata associated with the collaborative content item, or any other method of providing collaborative content items between devices in the network. The access module can also provide collaborative content items via a search of the collaborative content item database (i.e., search by a keyword associated with the collaborative content item, the title, or a metadata tag, etc.).

The copy generator 412 can duplicate a collaborative content item. Generally, the copy generator duplicates a collaborative content item when a client device selects an access link associated with the collaborative content item. The copy generator 412 accesses the collaborative content item associated with the access link and creates a derivative copy of the collaborative content item for every request received. The copy generator 412 stores each derivative copy of the collaborative content item in the collaborative content item database 408. Generally, each copy of the collaborative content item that is generated by the copy generator 412 is associated with both the client device from which the request was received and the user account associated with the client device requesting the copy. When the copy of the collaborative content item is generated it can create a new unique identifier and content pointer for the copy of the collaborative content item. Additionally, the copy generator 412 can insert metadata into the collaborative content item, associate metadata with the copied collaborative content item, or access metadata associated with the collaborative content item that was requested to be copied.

The collaborative content item differentiator 414 determines the difference between two collaborative content items. In one embodiment, the collaborative content item differentiator 414 determines the difference between two collaborative content items when a client device selects an access hyperlink and accesses a collaborative content item that the client device has previously used the copy generator 412 to create a derivative copy. The content item differentiator can indicate the differences between the content elements of the compared collaborative content items. The collaborative content item differentiator 414 can create a collaborative content item that includes the differences between the two collaborative content items, i.e. a differential collaborative content item. In some embodiments, the collaborative content item differentiator provides the differential collaborative content item to a requesting client device 120. The differentiator 414 can store the differential collaborative content item in the collaborative content item database 408 and generate identification information for the differential collaborative content item. Additionally, the differentiator 414 can insert metadata into the accessed and created collaborative content items, associate metadata with the accessed and created collaborative content item, or access metadata associated with the collaborative content items that were requested to be differentiated.

The settings and security module 416 can manage security during interactions between client devices 120, the content management system 100, and the collaborative content management system 130. Additionally, the settings and security module 416 can manage security during interactions between modules of the collaborative content management system. For example, when a client device 120 attempts to interact within any module of the collaborative content management system 100, the settings and security module 416 can manage the interaction by limiting or disallowing the interaction. Similarly, the settings and security module 416 can limit or disallow interactions between modules of the collaborative content management system 130. Generally, the settings and security module 416 accesses metadata associated with the modules, systems 100 and 130, devices 120, user accounts, and collaborative content items to determine the security actions to take. Security actions can include: requiring authentication of client devices 120 and user accounts, requiring passwords for content items, removing metadata from collaborative content items, preventing collaborative content items from being edited, revised, saved or copied, or any other security similar security action. Additionally, settings and security module can access, add, edit or delete any type of metadata associated with any element of content management system 100, collaborative content management system 130, client devices 120, or collaborative content items.

The metadata module 418 manages metadata within with the collaborative content management system. Generally, metadata can take three forms within the collaborative content management system: internal metadata, external metadata, and device metadata. Internal metadata is metadata within a collaborative content item, external metadata is metadata associated with a CCI but not included or stored within the CCI itself, and device metadata is associated with client devices. At any point the metadata module can manage metadata by changing, adding, or removing metadata.

Some examples of internal metadata can be: identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be: content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content management system 130 settings; user account settings; or any other metadata that can be associated with the collaborative content item. Some examples of device metadata can be: device type; device connectivity; device size; device functionality; device sound and display settings; device location; user accounts associated with the device; device security settings; or any other type of metadata that can be associated with a client device 120.

The collaborative content item revision module 420 manages application level requests for client applications 200 for revising differntial collaborative content items and selectively interacts with backend servers 406 for processing lower level processing tasks on collaborative content items, and interfacing with collaborative content items database 408 as needed. The revision module can create a revised collaborative content item that is some combination of the content elements from the differential collaborative content item. The revision module 420 can store the revised collaborative content item in the collaborative content item database or provide the revised collaborative content item to a client device 120. Additionally, the revision module 420 can insert metadata into the accessed and created collaborative content items, associate metadata with the accessed and created collaborative content item, or access metadata associated with the collaborative content items that were requested to be differentiated.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system, and cannot be performed in the human mind simply by mental steps.

Content Item Management Module

Figure 5:
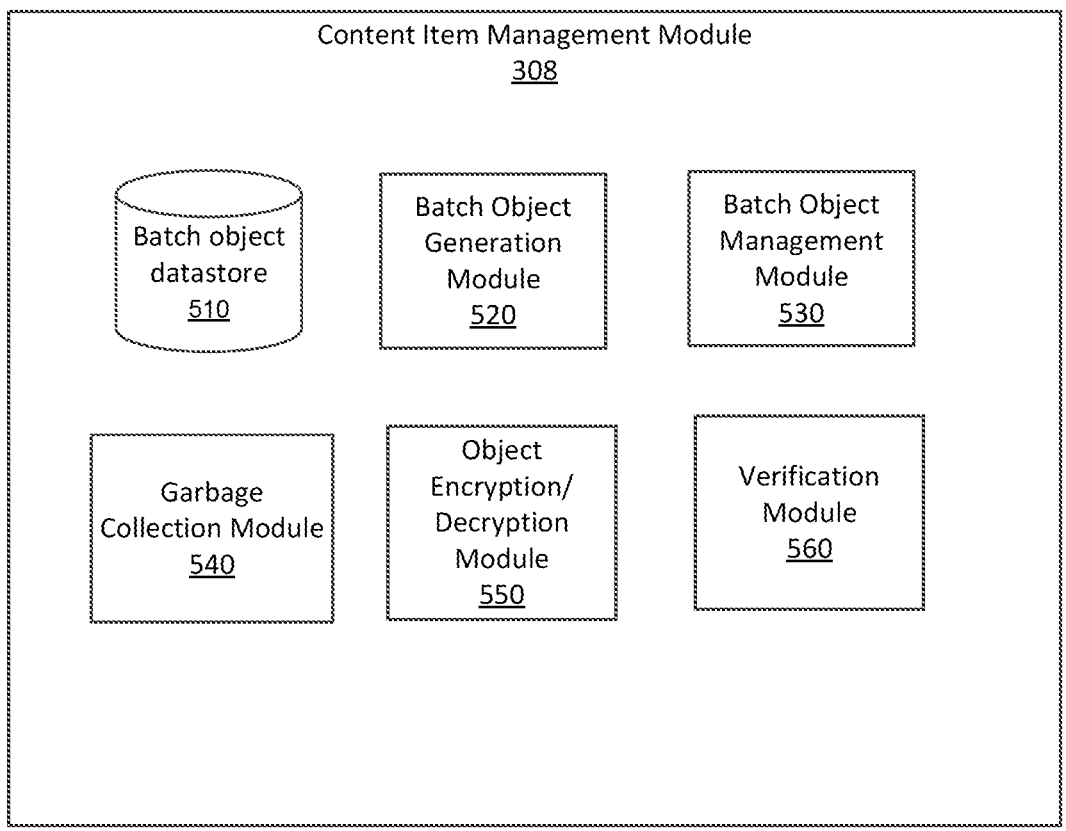
FIG. 5 shows a block diagram of modules in a content item management system, according to one example embodiment.

FIG. 5 illustrates an example embodiment of content item management module 308. The content item management module 308 includes a batch object datastore 510 that stores metadata associated with objects and batch objects, a batch object generation module 520 that generates batch objects (or batches), a batch object management module 530 that handles various operations associated with batch objects, a garbage collection module 540 that deletes expired batches and consolidates partially expired batches, an object encryption/decryption module 550 that encrypts and decrypts objects, and a verification module 560 that verifies metadata associated with objects and batches. The modules shown in FIG. 5 are non-limiting and are for illustrative purposes only; more or fewer modules may be used to achieve the functionality described herein.

Batch object datastore 510 is a data structure that stores metadata associated with objects and batch objects. In one embodiment, the batch object datastore 510 stores metadata associated with a batch object and the objects that the batch contains when the batch object is created. The metadata may be used to reference an object during a read operation as an object may be located by using metadata such as a batch identifier, location of the object in the batch, and length of the object. The metadata may also be referenced to perform maintenance and keep track of information such as expiration time and compliance identifier for each object and each batch object. Batch object datastore 510 and the exemplary metadata are discussed in further detail below.

FIG. 6 illustrates exemplary particulars of batch object data store 510 in further detail. FIG. 6 illustrates an example object metadata structure 610 and batch metadata structure 620. In one embodiment, the information associated with each object or each batch object may be referred to as an entry. For example, in the object metadata structure 610, the row of information associated with object 1 may be referred to as an entry for object 1.

In one embodiment, the fields for object metadata structure 610 are as follows:

Object ID: As used herein, the term Object Identifier (ID) may refer to a unique identifier assigned by the content item management module 308 to identify a particular object.

Batch ID: As used herein, the term Batch Identifier (ID) may refer to a unique identifier that indicates the batch object containing the respective object.

Length: As used herein, the term length may refer to length of the content of an object measured in a number of units. Examples of the units include but are not limited to: number of characters, bytes, megabytes, gigabytes, etc.

Offset: As used herein, the term offset may refer to length of content in a batch object to skip before the content for the object starts. For example, as illustrated in FIG. 6, object 1 and object 2 are both in batch 1. Object 1 has 0 offset units, which indicates that object 1 is located at the beginning of the batch. Because object 1 has a length of 1 unit, the content of object 2 may be stored in the batch starting from the 2 nd unit. Therefore, object 2 has a 1-unit offset, indicating that the content of object 2 starts from the 2 nd unit.

Expiration time: As used herein, the term expiration time may refer to a time stamp indicating that an object expires if current time is after the time stamp. In some embodiments, instead of storing an expiration time for an object, the entry may store a time interval (e.g., a time-to-live (TTL) interval) representing the length of time between the time that the object was created and the time that the object should expire.

Compliance identifier: As used herein, the term compliance Identifier (ID) may refer to an identifier that identifies compliance entity for an object. A compliance entity may be a namespace or a logical grouping of objects. A compliance entity may be a compliance category that is associated with compliance requirements such as policies for managing objects and access control that restricts users from accessing or modifying objects. In one embodiment, each object is associated with a compliance identifier and objects with the same compliance identifier may be grouped into a same batch. Discussion of how objects are grouped into a same batch appears in further detail below with respect to the description of batch object generation module 520.

Checksum: As used herein, the term checksum may refer to a string of letters and numbers generated from a checksum function. The checksum represents a small-sized datum derived from content of an object for the purpose of detecting errors that may have been introduced during its transmission or storage.

KEK Version: As used herein, the term key-encryption key (KEK) version may refer to current version number of key-encryption key (KEK). A key-encryption-key is the key that encrypts encryption keys. KEKs are rotated periodically to different versions and the field KEK version indicates the current version of KEK.

EEK: As used herein, the term encrypted encryption-key (EEK) may refer to current version of encrypted encryption-key (EEK). Each encrypted object is associated with an encryption key. An encryption key may be further encrypted with a KEK, which may be stored in an external secret repository. EEKs are rotated with KEK periodically. The field EEK stores a current version of the EEK.

In one embodiment, batch metadata structure 620 includes the following information:

Batch ID: As used herein, the term Batch Identifier (ID) may refer to a unique identifier assigned by the content item management module 308 that identifies a particular batch.

Length: As used herein, the term length may refer to the length of the batch measured in a number of units. The length of the batch may be the sum of the length of the objects in the batch.

Compliance identifier: As used herein, the term Compliance ID (Identifier) may refer to a compliance entity for objects in the batch. In one embodiment, each batch is associated with one compliance identifier as objects grouped into the same batch have the same compliance entity.

Status: As used herein, the term status may refer to a status identifier that indicates if the batch object is successfully stored to content storage 318. A status "closed" indicates that the batch object is successfully stored to content storage 318 and may be removed from the content item management module 308. An "open" status indicates that the batch is not yet fully transmitted to content storage 318. A batch object may be initially assigned a status "open" when created and the status may be changed to "closed" responsive to the batch object being successfully stored to content storage 318.

Returning to the description of FIG. 5, the batch object generation module 520 identifies objects to consolidate and generates one or more batch objects containing the identified objects. In one embodiment, the batch object generation module 520 identifies incoming objects that are associated with a same namespace (e.g. same compliance entity) and arrive within a same time interval. In one embodiment, the batch object generation module 520 may assign a default time interval when creating a batch object, such as 5 minutes, 10 minutes, an hour, etc. In another embodiment, the batch object generation module 520 may determine a time interval based on incoming objects. For example, the batch object generation module 520 may assign a short time interval for objects that arrive frequently and may assign a long time interval for objects that arrive sporadically. Additionally or alternatively, the generation of each batch object may be based on a size limit and/or a wait time limit. For example, responsive to detecting that the size of a group of incoming objects (e.g., in terms of the number of objects and/or the total size of the objects) reaches a certain size limit or that the group of objects have been waiting for additional incoming objects longer than a certain time limit, the batch object generation module 520 may create a batch object containing the group of objects identified thus far and store the batch to content storage 318. In another embodiment, the batch object generation module 520 may queue a group of incoming objects and consolidate the group of objects to a batch in a specific order based on metadata of objects. The batch object generation module 520 may determine different ordering rules based on different objects to be consolidated into a batch.

The batch object generation module 520 may then issue a write request to content storage 318 to store the generated batch object. The batch object generation module 520 may issue a single write request to content storage 318 to store the batch object that contains a group of identified objects, instead of issuing a write request for each object of the group of objects. In one embodiment, the batch object generation module 520 may save a temporary copy of the content of the batch object in the batch object generation module 520 to avoid loss of information in case of potential issues that may happen while data is being transferred. The content storage 318 may notify the batch object generation module 520 if the batch object is successfully stored. Responsive to a receipt that the batch object is successfully stored to content storage 318, the batch object generation module 520 may generate and store information associated with the batch object and the objects it contains in a data structure in the batch object datastore 510, such as the data structure containing object metadata structure 610 and batch metadata structure 620 illustrated in FIG. 6. The data structure stores information such as the batch (i.e. field "Batch ID") that contains the object and information such as length and location (e.g., offset) of the object within the batch, which may serve as a mapping that connects objects with their respective batches and improves efficiency when accessing objects in content storage 318. Additionally, responsive to the batch being successfully stored to content storage 318, the batch object generation module 520 may update this batch's "Status" as stored in the data structure to "closed," indicating that the batch is stored in content storage, and subsequently delete the temporary batch object from the batch object generation module 520.

The batch object management module 530 may perform various functionalities such as managing reading requests, segmenting and storing large objects, and determining an object storage system to store a batch or an object. The various functionalities are discussed in detail below.

In some embodiments, the batch object management module 530 may receive read requests to read objects stored in content storage 318. Responsive to receiving a read request, the batch object management module 530 may identify metadata of the batch object in order to process the read request. In the case where the batch object management module 530 receives a request from client to access an object (e.g., a read request), the batch object management module 530 may check in the metadata if the object is stored in content storage 318 and if the object is expired based on the field "Expiration Time." Responsive to determining that the object is stored in content storage 318 and is not expired, the batch object management module 530 may issue a request to content storage 318 to read the object based on metadata associated with the object. The batch object management module 530 may access the object by identifying the batch ID of the batch that contains the object and locating the object in the batch using offset and length of the object. In one embodiment, batch object management module 530 may send a read request to content storage 318, where the read request may specify the batch ID to read from and the location (i.e. offset) of the batch to read from. The read request may further comprise a length to read starting from the offset. On the other hand, responsive to the object being detected as expired, the batch object management module 530 may not access content storage 318 to avoid waste in bandwidth and time. The batch object management module 530 may then return a message to the content management system 100 indicating that the object is expired, and the message may be further passed on to client 120 through network 110.

In another embodiment, the batch object management module 530 may segment a large object into multiple smaller objects that are within a size limit, responsive to detecting that the large object is over the size limit. The metadata associated with the large object may further consist a field indicating a list of batch IDs representing the batches that each stores a part of the large object. In one embodiment, the list of batch IDs may be a linked list, with pointers connecting the list of batch IDs in a certain order that represents the order of the content in the original large object.

In another embodiment, content storage 318 may include multiple object storage systems. In such an embodiment, the batch object management module 530 may determine in which object storage system to store an object and/or a batch object based on parameters associated with the batch object to be stored and parameters associated with the different object storage systems. For example, the batch object parameters may include, but are not limited to, size of the objects, size of the batches, geographic location(s) of the owner/requestor(s) associated with the objects within the batch, compliance requirements associated with the batch, etc. The object storage system parameters may include, but are not limited to, capacity of the storage systems, geographic location of servers, minimum, maximum, or optimal object size supported, storage types (e.g., hard drives or solid-state drives), performance parameters (e.g., read and/or write latency), security parameters (e.g., whether the system supports encryption or not), costs associated with storing an object of a particular size on a particular storage system, etc. For example, some object storage systems may be more efficient in maintaining smaller objects (e.g. smaller than 4 MB) in larger quantities while other object storage systems may be more efficient in maintaining larger objects. The different behaviors of different object storage systems may be attributed, for example, to different file formats that the object storage systems use to store objects. As another example, for a client who is located in Australia, if two object storage systems are comparable in other parameters but the servers for the two object storage systems are located in Australia and the U.S., respectively, the object storage system with server located in Australia may be determined to be a better option to store the object because a closer distance between the object and the server may result in a faster speed for data transferring.

In some embodiments, the garbage collection module 540 may delete expired objects and consolidate batches containing both expired and non-expired objects into a new batch. As discussed above, each object may be associated with an expiration time, which may be determined by clients 120 or compliance rules associated with the object's respective compliance entity. In one embodiment, expired objects are deleted from content storage 318, while in another embodiment, clients 120 may extend the current expiration time to a later time to keep the object alive longer in content storage 318.

Garbage collection module 540 may delete a batch object responsive to detecting all the objects in the batch are expired. In one embodiment, content storage 318 may store expiration time on a per-item basis. As objects are stored as batches in content storage 318, the smallest unit stored in content storage 318 is on a batch level. Therefore, for batch objects stored in content storage 318, an expiration time is associated with each batch object in content storage 318 (instead of an expiration time associated with each individual object). In some embodiments, batches stored in content storage 318 may be assigned or associated with a batch expiration time. For example, if all objects in the batch have the same expiration time, the batch may be assigned the same expiration time, and content storage 318 may automatically delete the batch at that expiration time. As another example, in some embodiments if objects in the batch have different expiration times, the batch may be assigned a batch expiration time equal or greater than the greatest expiration times of its objects, and content storage 318 may automatically delete the object at that expiration time. Alternatively, in some embodiments, garbage collection module 540 may not assign a batch expiration time to the batch. Instead, garbage collection module 540 may periodically scan through metadata maintained in batch object datastore 510, compare current time with expiration time, and identify expired objects. Responsive to garbage collection module 540 detecting that all the objects in a batch are expired, garbage collection module 540 may send content storage 318 a request to delete the batch object from content storage 318, and delete the respective entries for the batch and the objects from batch object datastore 510.

In one embodiment where a batch object contains both expired and non-expired objects, garbage collection module 540 may create a new batch object containing the non-expired objects and delete the old batch object. In another embodiment, garbage collection module 540 may identify, within the content storage 318, one or more batch objects with the same compliance ID and create a new batch object that consolidates the non-expired objects in the old batches. For example, a first batch object may include a first object that is expired and a second object that is not expired, and the first object may be associated with a compliance rule that requires removal of the first object as soon as it is expired. In such a case, garbage collection module 540 may identify a second batch object that may contain both expired and non-expired object, and create a new batch that consolidates the non-expired objects from the two batches and delete the old batches, which contain the expired objects. In the illustrated example, two batches are consolidated, but any number of one or more batches may be identified and consolidated. In one embodiment, garbage collection module 540 may identify batches that, when consolidated, have a size that is close to the size limit of a batch object. In another embodiment, garbage collection module 540 may identify batches that contain objects with similar expiration time. Then, garbage collection module 540 may store the new batch object in content storage 318 and store metadata associated with the new batch object in batch object datastore 510. Garbage collection module 540 may then send content storage 318 a request to delete the old batches from content storage 318 and delete metadata associated with the old batches from batch object datastore 510.

Object encryption/decryption module 550 encrypts and decrypts objects and rotates encryption keys periodically. In one embodiment, an object may be encrypted using an encryption key. The encryption key may be further encrypted with a key-encryption key (KEK) and, as a result, the encryption key is encrypted into an encrypted encryption-key (EEK). Object encryption/decryption module 550 may generate a new version of the set of KEK and EEK periodically to replace the old version to minimize potential exposure of the encryption keys to attackers. The process of replacing an old key by generating a new key periodically may be referred to as key rotation. Current version number associated with KEK and current version of EEK are stored in the metadata maintained in batch object datastore 510.

Verification module 560 checks validity of metadata maintained in batch object datastore 510 by performing various checks. For example, verification module 560 may check if the offset and length associated with objects are valid. Referring to the example metadata in FIG. 6, assume object 2 has an offset value of 0 (instead of 1), which indicates that object 1 and object 2 overlap because object 1 is also located in the batch with 0 unit offset and has a length of 1 unit. As another example of invalidity in metadata, assume that batch 1 in batch metadata structure 620 has a length of 1 (instead of 2), the metadata is also invalid because object metadata structure 610 shows that both object 1 and object 2 are stored in batch 1 and the total length for both the objects is 2, which contradicts the metadata indicating batch 1 has length 1. Responsive to detecting invalidity in metadata, verification module 560 may access the object or the batch object, retrieve correct metadata information, and update their respective metadata.

Figure 7:
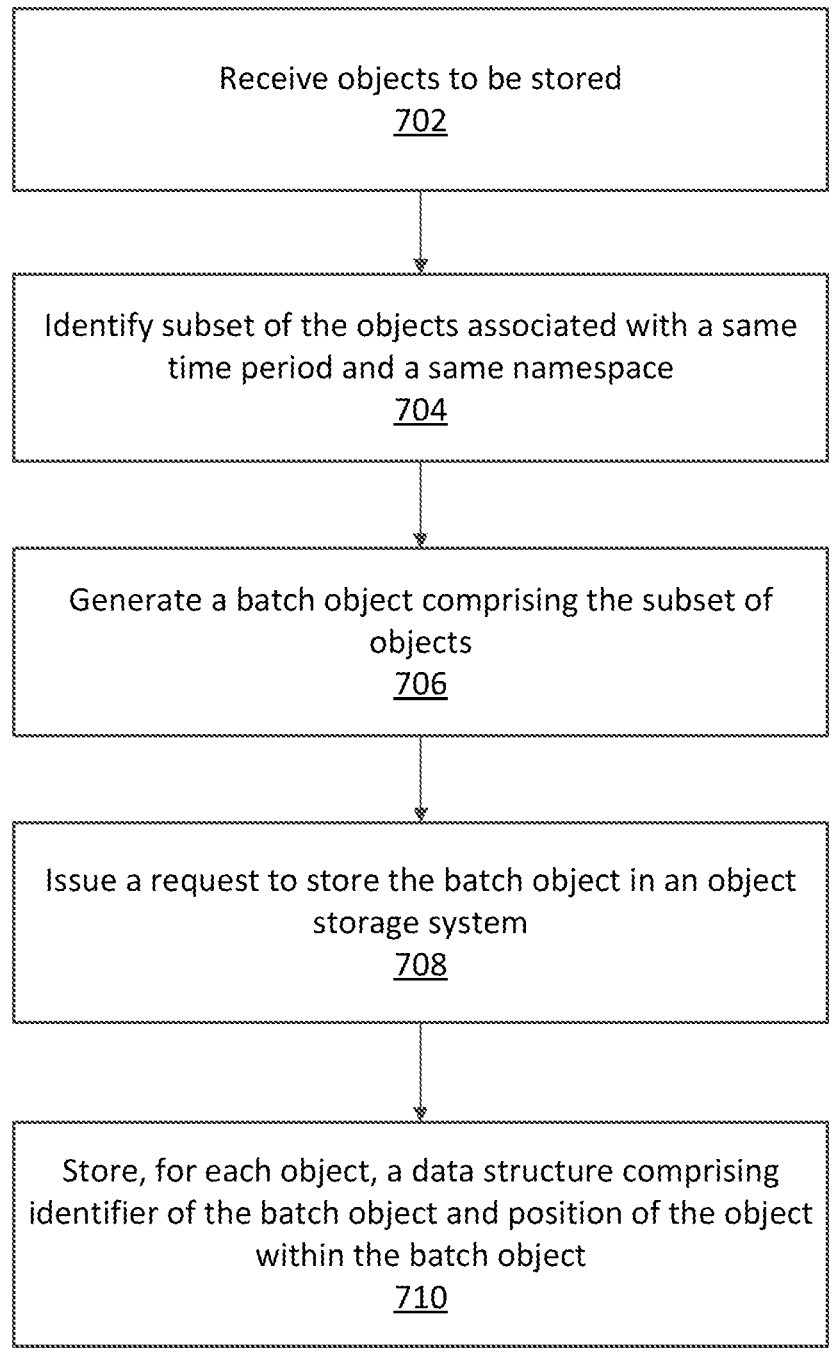
FIG. 7 shows an exemplary storing process managed by the content item management system, according to one example embodiment.

FIG. 7 is a flow chart that illustrates an example process of storing objects as batches to content storage 318. The content item (i.e. object) management system (e.g. using content item management module 308) receives 702 objects to be stored and batch object generation module 520 identifies 704 a subset of the objects associated with a same time period (i.e. objects arriving within a same time period) and with a same namespace (e.g. compliance entity). Then the object management system (e.g. using batch object generation module 520) generates 706 a batch object containing the subset of objects and issues 708 a request to content storage 318 to store the batch object. The object management system (e.g. using batch object generation module 520) may generate and store a data structure to batch object datastore 510, where the data structure comprises identifier of the batch object and position (i.e. offset) of the object within the batch.

Figure 8:
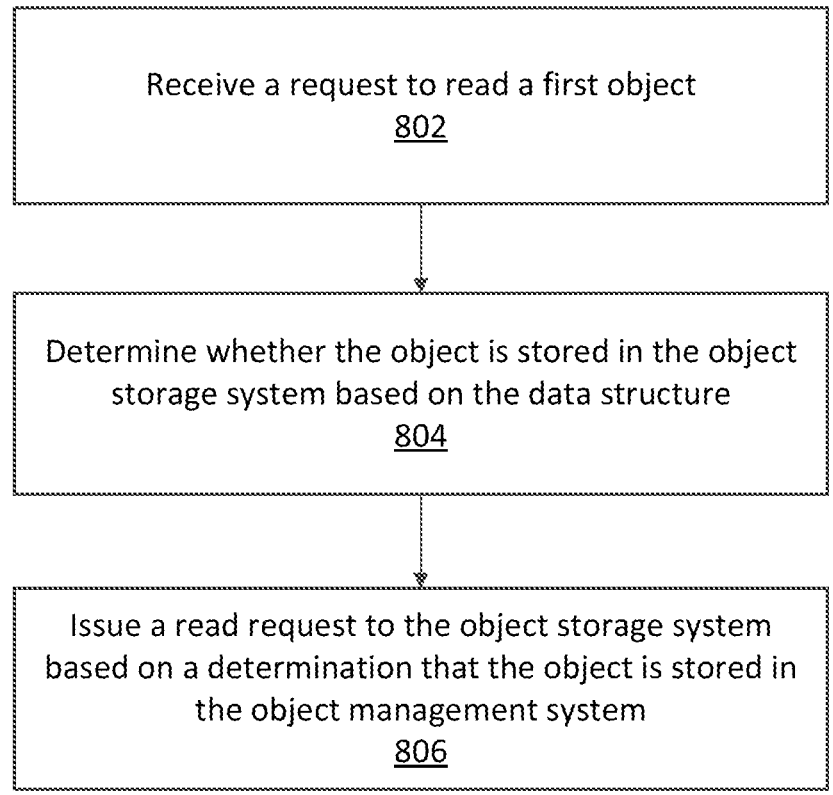
FIG. 8 shows an exemplary reading process managed by the content item management system, according to one example embodiment.

FIG. 8 is a flow chart that illustrates an example process of accessing objects in content storage 318. Upon receiving 802 a request to read an object, the object management system (e.g. using batch object management module 530) may determine 804 whether the object is stored in the object storage system based on the data structure stored in batch object datastore 510. Responsive to determining that the object is stored in content storage 318, the object management system (e.g. using batch object management module 530) may issue a read request to access the object in the object storage system.

Examples Use Cases of the Content Item Management System

Figure 9:
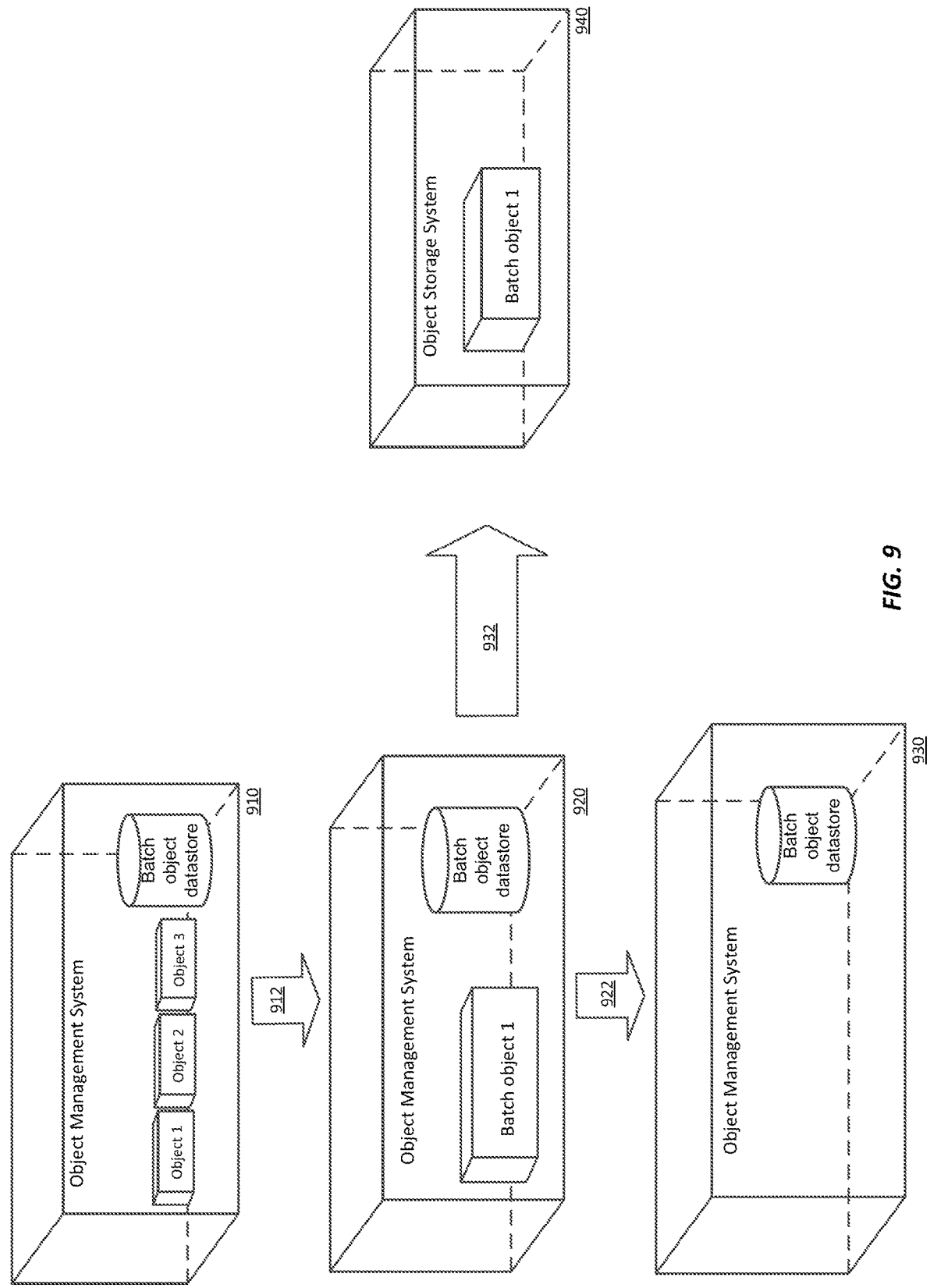
FIG. 9 shows an exemplary system and method of consolidating and storing objects as a batch object, according to one example embodiment.
Figure 10:
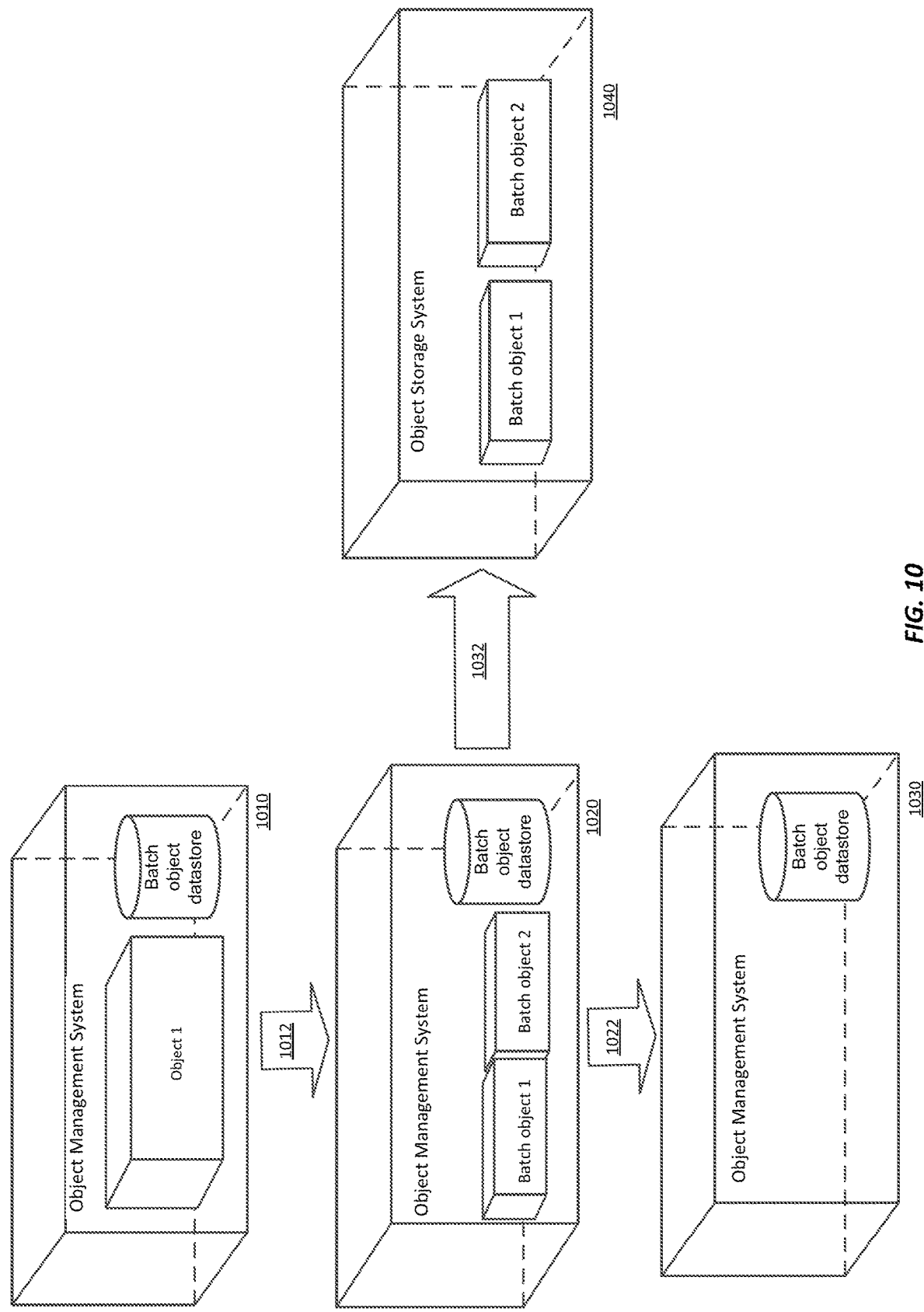
FIG. 10 shows an exemplary system and method of segmenting and storing one object as multiple batch objects, according to one example embodiment.
Figure 11:
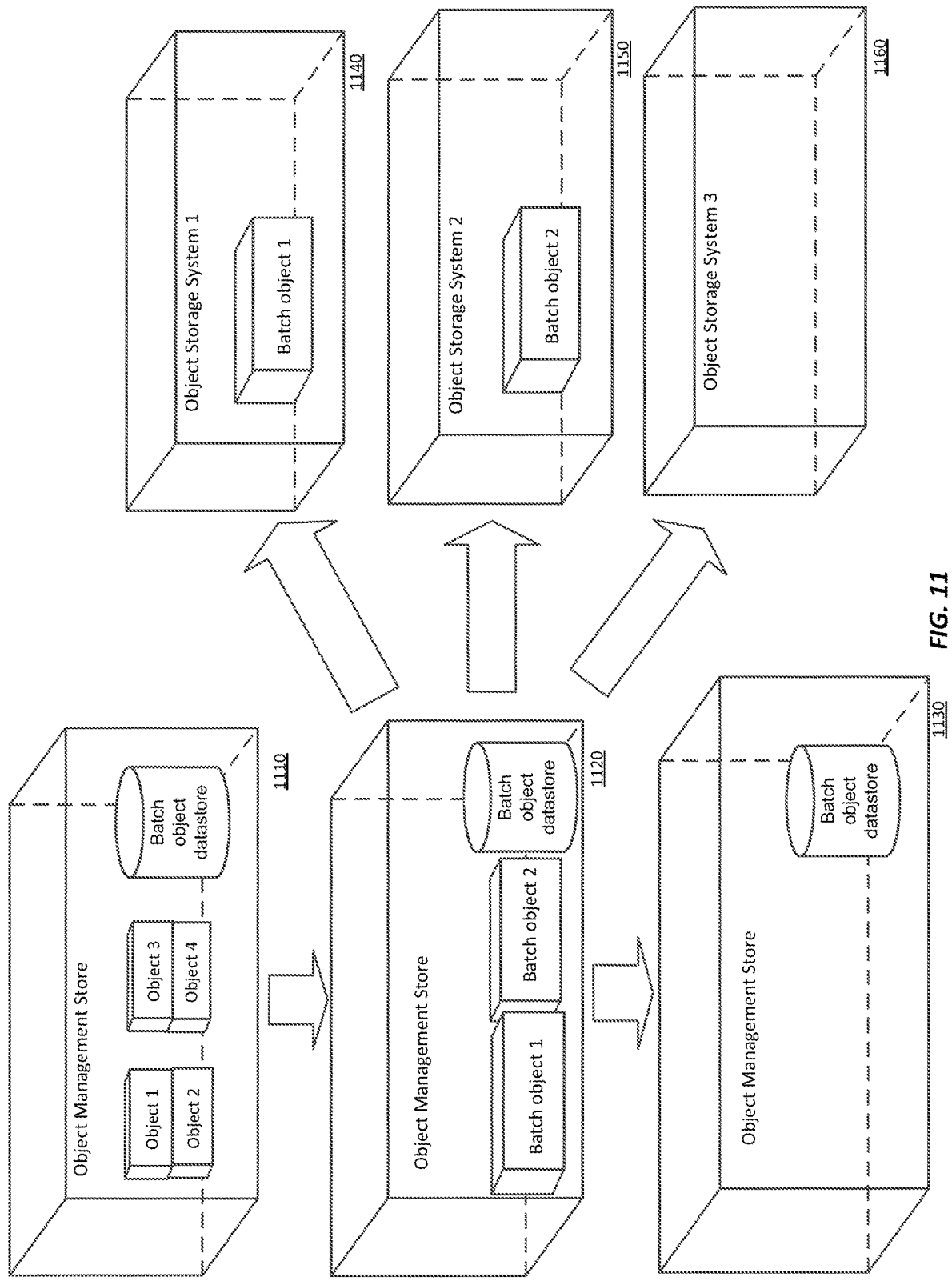
FIG. 11 shows an exemplary system and method of routing multiple batch objects to different object storage systems, according to one example embodiment.

FIGS. 9-11 illustrate example use cases of various embodiments of content item management module 308 (which may be referred to as object management system).

FIG. 9 illustrates one example embodiment of the object management system (e.g. content item management module 308), in accordance with one embodiment. Object management store 910 may receive objects 1-3 that arrive within a same time interval and are associated with the same namespace (e.g. compliance entity). The batch object generation module 520 may then consolidate 912 the objects into batch object 1 (as shown in 920) and store metadata of the batch object and objects 1-3 in the batch object datastore 510. Batch object generation module 520 may then send a request to an object storage system 940 and store 932 the batch object in the object storage system. The object management system as illustrated in 930 may maintain metadata stored in batch object datastore 510 and may delete 922 the objects if the batch object is successfully stored in the object storage system.

FIG. 10 illustrates another example of the object management system, in accordance with one embodiment. In this embodiment, size of the received object 1 is larger than the size of a batch object. The batch object management module 530 may segment object 1 into multiple batch objects such as batch objects 1 and batch object 2 shown in 1020. The batch object management module 530 may then store 1032 batch object 1 and batch object 2 to the object storage system. Batch object management module 530 may store, in batch object datastore 510, metadata for object 1 with a data entry such as "Batch object 1→Batch object 2," which indicates that object 1 is segmented and stored in the order of batch 1 and then batch 2.

FIG. 11 illustrates another example embodiment of the object management system, in accordance with another embodiment. In FIG. 11, multiple object storage systems such as object storage system 1-3 are available for storage. The batch object generation module 520 may consolidate objects 1 and 2 into batch object 1 and consolidate objects 3 and 4 into batch object 2. Batch object management module 530 may then determine, for each batch object, an object storage system to store the batch. In the example illustrated in FIG. 11, batch object management module 530 may determine to send batch object 1 to object storage system 1 and send batch object 2 to object storage system 2 for storage. The batch object datastore may store, in the data structure, metadata for each batch indicating the respective object storage system that stores the batch objects.

ADDITIONAL CONSIDERATIONS

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. It will be understood that any computer programming language may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, read-only memories (ROMs), random access memories (RAMs), magnetic or optical cards, or any type of media suitable for storing electronic instructions, and each coupled to a computer system bus. Furthermore, the computers referred to in the specification may include a single processor or may be architectures employing multiple processor designs for increased computing capability.

The algorithms presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

As used herein, the word "or" refers to any possible permutation of a set of items. Moreover, claim language reciting 'at least one of' an element or another element refers to any possible permutation of the set of elements.

Although this description includes a variety of examples and other information to explain aspects within the scope of the appended claims, no limitation of the claims should be implied based on particular features or arrangements these examples. This disclosure includes specific embodiments and implementations for illustration, but various modifications can be made without deviating from the scope of the embodiments and implementations. For example, functionality can be distributed differently or performed in components other than those identified herein. This disclosure includes the described features as non-exclusive examples of systems components, physical and logical structures, and methods within its scope.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
   receiving, by an object management system, a plurality of objects to be stored;
   identifying, within the plurality of objects, a subset of objects associated with a same set of one or more parameters, the identifying comprising distinguishing the subset of objects from other objects within the plurality of objects that do not share the same set of one or more parameters;
   generating a batch object comprising the subset of objects and excluding the other objects;
   issuing a write request to store the batch object in an object storage system;
   for each object in the subset of objects, storing, by the object management system, an entry in a data structure;
   upon receiving, by the object management system, a first read request for a first object in the subset of objects, accessing the data structure to determine whether the object is stored in the object storage system;
   based on a determination that the object is stored in the object storage system, issuing a second read request to the object storage system;
   detecting that all objects of the subset of objects in the batch object are expired based on an expiration time associated with each object; and
   responsive to detecting that all of the subset of objects in the batch object are expired:
   sending to the object storage system a request to delete the batch object from the object storage system; and
   updating the data structure.

2. The method of claim 1, wherein the same set of one or more parameters comprises a same time period and a same namespace.

3. The method of claim 1, wherein the entry comprises an identifier of the batch object and a position of the object within the batch object.

4. The method of claim 1, wherein storing the data structure further comprises storing metadata associated with each object in the subset of objects to the data structure, the metadata comprising at least one of: a size of the object, the expiration time, a compliance category, the identifier of a batch object, and a position in the batch object.

5. The method of claim 1, further comprising:
   sampling an object from the objects in the batch object;
   accessing metadata for the sampled object and metadata of the batch object;
   verifying whether the metadata for sampled object is valid;
   responsive to detecting that the metadata for the sampled object is invalid, updating the metadata based on information associated with the sampled object; and
   outputting a result based on the verifying.

6. The method of claim 1, further comprising:
   determining that the batch object is successfully stored in the object storage system based on the write request;
   responsive to determining that the batch object is successfully stored in the object storage system based on the write request, changing a status identifier of the batch object to closed and deleting the batch object from the object management system.

7. The method of claim 1, wherein issuing the write request further comprises:
   determining parameters of the batch object;
   determining, from a plurality of candidate object storage systems, that the object storage system satisfies the parameters; and responsive to determining that the object storage system satisfies the parameters, selecting the object storage system to store the batch object.

8. The method of claim 1, further comprising:
encrypting each object in the subset of objects with an encryption key; and
generating an encrypted batch object comprising the encrypted objects,
wherein the write request is to store the encrypted batch object to the object storage system.

9. The method of claim 1, wherein the subset of objects associated with the same set of one or more parameters belong to a same compliance category.

10. The method of claim 1, further comprising:
determining that a size of an object of the plurality of objects exceeds a threshold of a batch object;
responsive to determining that the size of the object exceeds the threshold, segmenting the object into a plurality of segments; and
storing the plurality of segments using separate batch objects.

11. A non-transitory computer-readable storage medium storing executable computer instructions that, when executed by one or more processors, cause the one or more processors to perform operations, the executable computer instructions comprising instructions to:
receive, by an object management system, a plurality of objects to be stored;
identify, within the plurality of objects, a subset of objects associated with a same set of one or more parameters, the identifying comprising distinguishing the subset of objects from other objects within the plurality of objects that do not share the same set of one or more parameters;
generate a batch object comprising the subset of objects and excluding the other objects;
issue a write request to store the batch object in an object storage system;
for each object in the subset of objects, store, by the object management system, an entry in a data structure;
upon receiving, by the object management system, a first read request for a first object in the subset of objects, access the data structure to determine whether the object is stored in the object storage system;
based on a determination that the object is stored in the object storage system, issue a second read request to the object storage;
detect, based on expiration times associated with a first object in a first batch object and a second object in the first batch object that the first object is expired and that the second object is not expired, wherein the first batch object is associated with a compliance category requiring the first object to be deleted after expiration; and
responsive to the detection:
add the second object to a second batch object; and
delete the first batch object.

12. The non-transitory computer-readable medium of claim 11, wherein the first batch object is associated with a compliance category requiring the first object to be deleted after expiration.

13. The non-transitory computer-readable storage medium of claim 11, wherein the same set of one or more parameters comprises a same time period and a same namespace.

14. The non-transitory computer-readable storage medium of claim 11, wherein the instructions to issue the write request comprise instructions to:
determine parameters of the batch object;
determine, from a plurality of candidate object storage systems, that the object storage system satisfies the parameters; and
responsive to determining that the object storage system satisfies the parameters, select the object storage system to store the batch object.

15. The non-transitory computer-readable storage medium of claim 11, wherein the instructions to issue the write request comprise instructions to:
determine that a size of an object of the plurality of objects exceeds a threshold of a batch object;
responsive to determining that the size of the object exceeds the threshold, segment the object into a plurality of segments; and
store the plurality of segments using separate batch objects.

16. The non-transitory computer-readable storage medium of claim 11, wherein the instructions further comprise instructions to:
encrypt each object in the subset of objects with an encryption key; and
generate an encrypted batch object comprising the encrypted objects,
wherein the write request is to store the encrypted batch object to the object storage system.

17. A system comprising:
memory with instructions encoded thereon; and one or more processors that, when executing the instructions, perform operations comprising:
receiving, by an object management system, a plurality of objects to be stored;
identifying, within the plurality of objects, a subset of objects associated with a same set of one or more parameters, the identifying comprising distinguishing the subset of objects from other objects within the plurality of objects that do not share the same set of one or more parameters;
generating a batch object comprising the subset of objects and excluding the other objects;
issuing a write request to store the batch object in an object storage system;
for each object in the subset of objects, storing, by the object management system, an entry in a data structure;
upon receiving, by the object management system, a first read request for a first object in the subset of objects, accessing the data structure to determine whether the object is stored in the object storage system;
based on a determination that the object is stored in the object storage system, issuing a second read request to the object storage system;
detecting that all objects of the subset of objects in the batch object are expired based on an expiration time associated with each object; and
responsive to detecting that all of the subset of objects in the batch object are expired:
sending to the object storage system a request to delete the batch object from the object storage system; and
updating the data structure.

18. The system of claim 17, wherein the same set of one or more parameters comprises a same time period and a same namespace.

19. The system of claim 17, wherein the entry comprises an identifier of the batch object and a position of the object within the batch object.

20. The system of claim 17, the operations further comprising:
 determining parameters of the batch object;
 determining, from a plurality of candidate object storage systems, that the object storage system satisfies the parameters; and
 responsive to determining that the object storage system satisfies the parameters, selecting the object storage system to store the batch object.

* * * * *